United States Patent [19]
Gassner, Jr.

[11] 3,946,646
[45] Mar. 30, 1976

[54] DUST-REPELLING APPARATUS

[76] Inventor: Johann Gassner, Jr., Post Grosshelfendorf, D-8011 Goggenhofen, Germany

[22] Filed: Oct. 2, 1974

[21] Appl. No.: 511,180

[30] Foreign Application Priority Data
Oct. 3, 1973  Germany............... 2349712

[52] U.S. Cl. ............... 98/2; 98/36; 296/91; 180/84
[51] Int. Cl.² ............... B60H 1/00; B60J 9/04
[58] Field of Search ........... 98/36, 2, 2.11, 2.14, 1, 98/50; 296/91, 28 C; 56/12.8; 180/84

[56] References Cited
UNITED STATES PATENTS

| | | | |
|---|---|---|---|
| 1,789,016 | 1/1931 | Morgan | 296/91 |
| 2,123,448 | 7/1938 | Weber | 98/1 |
| 2,817,281 | 12/1957 | Schwam et al. | 98/1 |
| 2,916,326 | 12/1959 | Finan | 296/91 |
| 3,112,002 | 11/1963 | Van Der Lely | 98/36 |
| 3,126,810 | 3/1964 | Karlsson et al. | 98/36 |
| 3,776,358 | 12/1973 | Williams | 296/91 |

*Primary Examiner*—John J. Camby
*Assistant Examiner*—Henry G. Yuen
*Attorney, Agent, or Firm*—Silverman & Cass, Ltd.

[57] ABSTRACT

A dust-repelling apparatus for a vehicle of the type having a driver's seat accessible to dust and an operating instrument of the type which builds up dust and is arranged ahead of the driver's seat, said apparatus comprising at least one source of air current arranged between the driver's seat and the operating instrument with the discharge of the blast air current directed in the viewing direction of the driver. Preferably the source of the air current is at least one ventilator being directed toward the operating instrument and having a pressure effect opposite to the current of the dust built up by the operating instrument.

8 Claims, 3 Drawing Figures

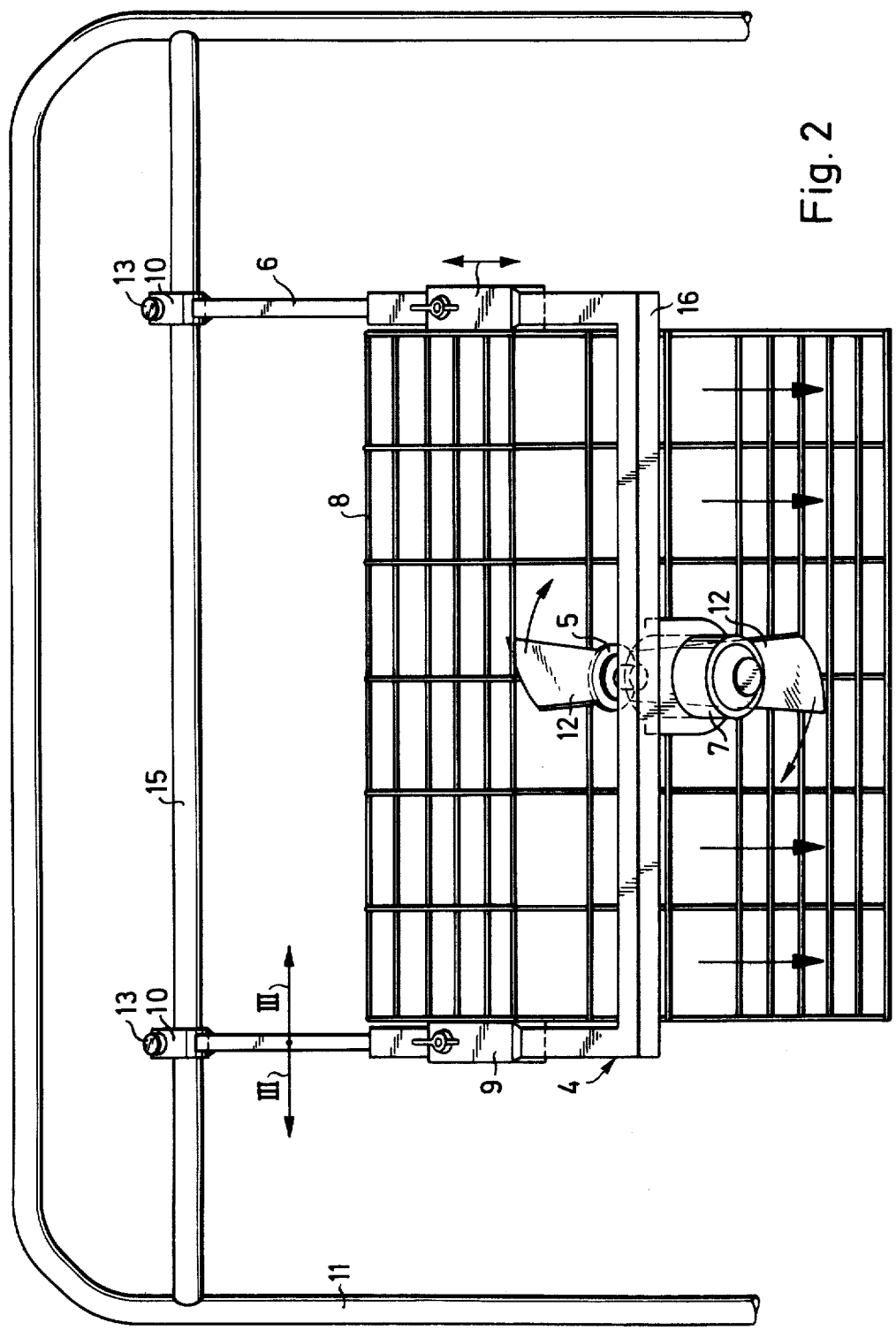

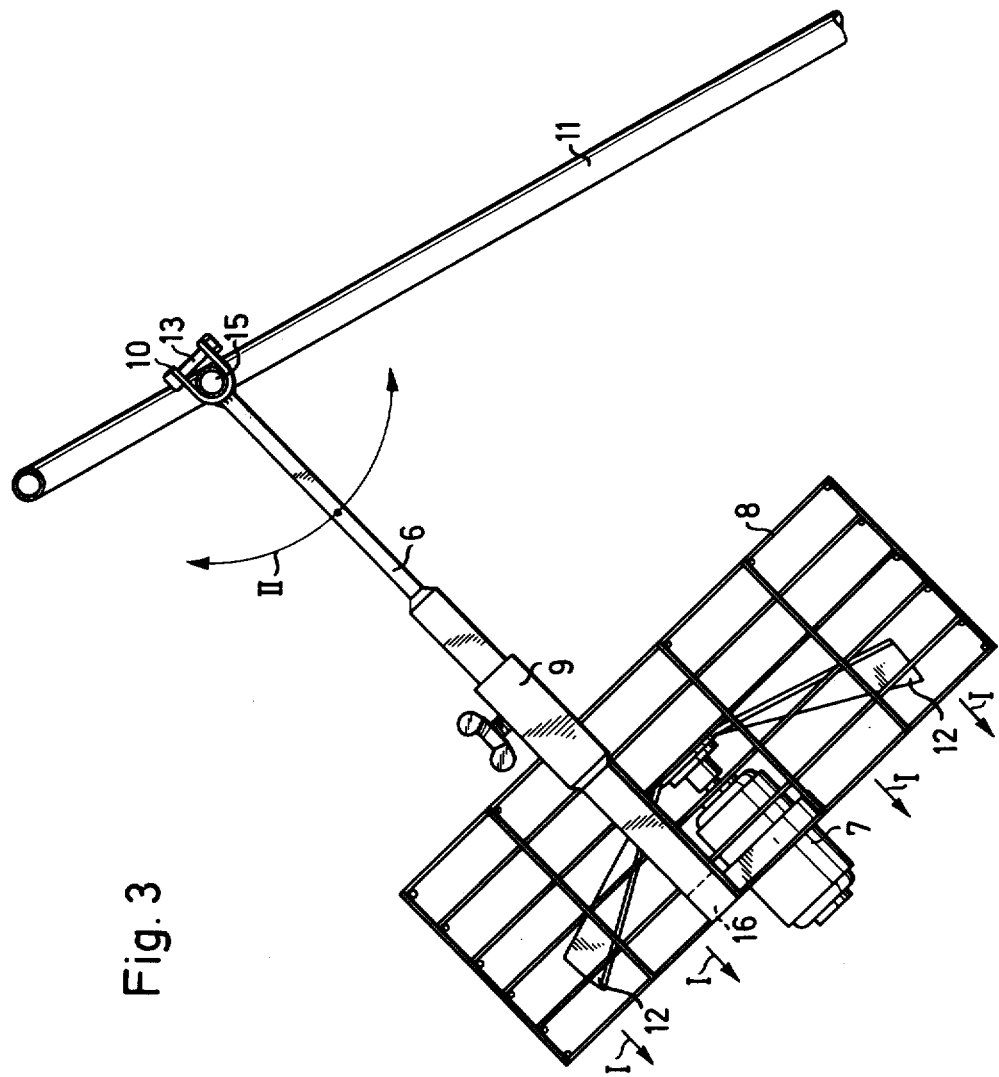

DUST-REPELLING APPARATUS

The invention relates to a dust-repelling apparatus for a vehicle with a driver's seat accessible to dust, with an operating appliance building up dust being arranged ahead of said seat, particularly a mower-thresher.

It is known already according to prior art to provide a cabin for abating the bother caused by dust and noise on mower-threshers. However, these cabins or cabs have the disadvantage of exposing the operator in case of nice weather to considerable heat. Thus, with warm weather, the cabs are opened and dust penetrates the driver's area.

The present invention is based on the problem of creating an apparatus which with simple design and low production cost protects the driver against dust in a simple manner.

According to the invention this problem is solved by arranging the discharge of the blast air current from a source of air current in viewing direction of the driver between the driver's seat and the operating instrument. This produces the advantage that the blast air current blows on the operating apparatus which develops dust, without the operator being seated in the range of the air generated by the source of air current. Thus, the operator is protected perfectly against the buildup of dust by the operating instrument. A ventilator of open design may be provided advantageously as a source of air current.

According to another characteristic of the invention the ventilator is directed obliquely toward the operating instrument, so that the driver is protected against any influences of dust.

In a further improvement of the invention, the ventilator is arranged at a frame fastened on the vehicle, in front of the operator. This frame may be pivotable, for example transversely to the driving direction. By provision of the frame the advantage is obtained that the dust repelling apparatus according to the invention can be installed later on any mower-thresher already existing. As a result of the pivotability of the frame the direction can be adjusted precisely, in order to keep the dust produced by the retractable components of the mower-thresher away from the operator's area in a satisfactory manner. As a result of the special arrangement of the instrument at the mower-thresher all harmful wind effects are deflected and no draft of air can be caused.

In another improvement of the invention, the ventilator is propellable by an air-cooled motor and surrounded in addition by a protective screen. This results in a highly simplified construction of the dust-repelling apparatus according to the invention, while preserving maximum operating safety.

According to another characteristic of the invention, the ventilator may be of the two blade design. As a result of two blades assurance is given to the driver so that he can keep an eye on the operating apparatus at all time without his vision being impaired by the rotation of the ventilator blade. In spite of all this, the driver is protected satisfactorily against the dust of the mower-thresher.

According to another feature of the invention the total length of the two blades may be greater than the driver's width, so that the driver is protected completely and advantageously.

According to another feature of the invention a wall placed transversely to the driving direction may be located behind the operator in the area of action of the ventilator. As a result of this wall, the wind conditions may be improved further with regard to the manner of operation of the ventilator.

According to another feature of the invention the ventilator blades may be transparent so that thereby the driver's vision toward the operating instrument is improved additionally.

Below the invention is described more in detail by means of an embodiment exemplified in the drawing. In the drawing, FIG. 1 shows a schematic overall view in perspective of a mower-thresher and of the dust repelling apparatus according to the invention.

FIG. 2 shows a front view upon the dust repelling apparatus according to the invention.

FIG. 3 shows a lateral view upon the dust repelling apparatus according to the invention.

Figure 1:
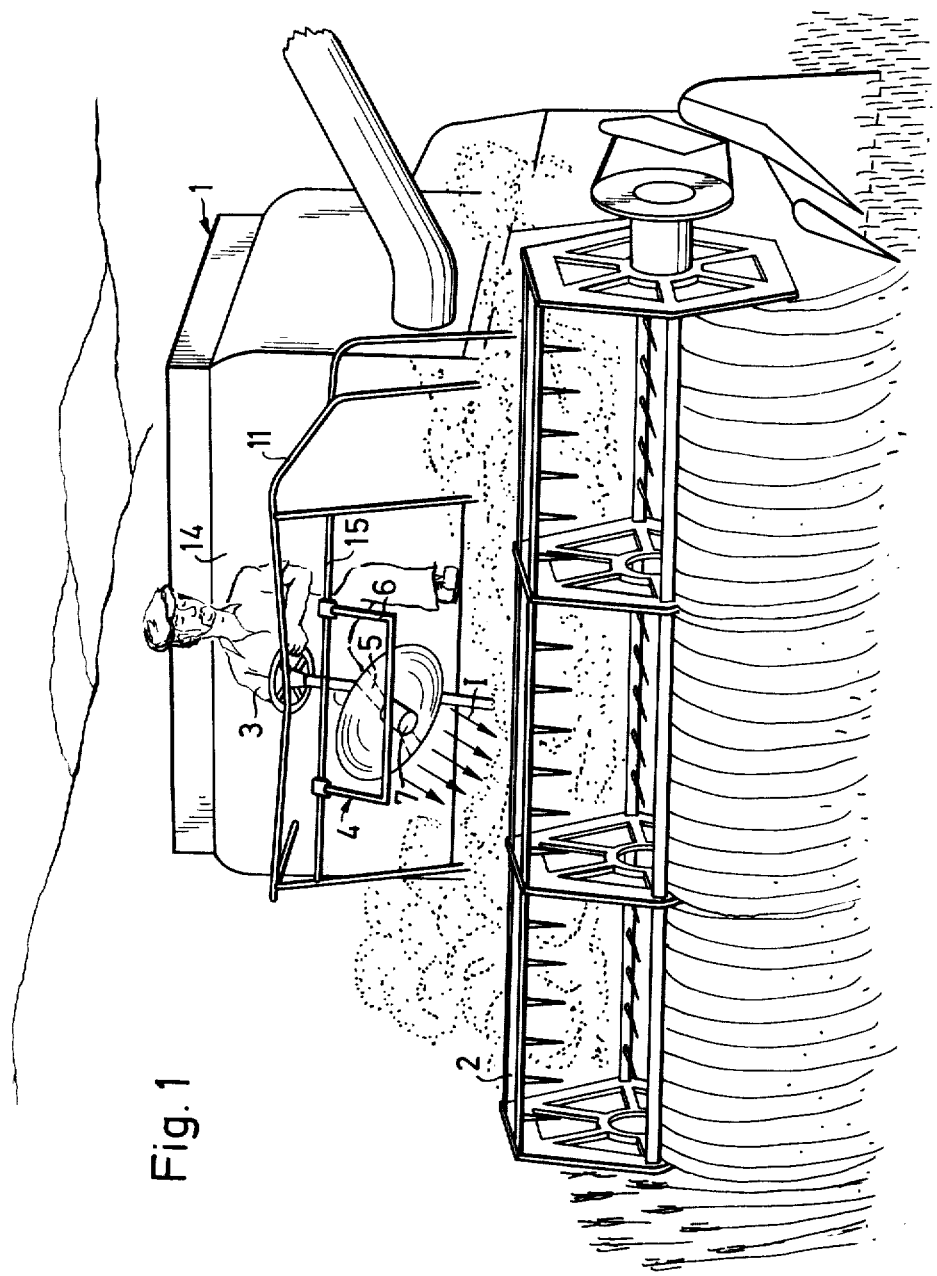

According to FIG. 1 a mower thresher 1 is provided with retractable components 2. The operator 3 is seated behind the retractable components in order to steer the thresher-mower accordingly. In its anterior area the mower-thresher 1 is provided with a front carriage 11 eqipped with a transverse strut 11.

The dust-repelling apparatus 4 is located on this strut 4 above a frame 6. For better clarity it was shown in FIG. 1 without a protective screen. This dust repelling apparatus is designed as ventilator 5, propelled preferably by a motor with a low number of revolutions, for example 1000 rpm. As a result of this ventilator 4, the dust caused by the rectractable components 3 of the mower-thresher 1 is kept away from the operator in a perfect manner. The ventilator operates in the direction of the arrow I, as shown in FIGS. 1 and 3, so that the dust is carried along by the drum of the mower-thresher.

According to FIG. 2, the frame 6 is U-shaped in design and has a transverse strutting 16. The motor and the ventilator are mounted on said transverse strutting 16. A protective screen 8 covering both ventilator blades 12, thereby protecting the operating personnel ahead of the ventilator blades, is located at both lateral struts of the frame 6 via adjustable bushings 9. The frame 6 is fastened via fastening flanges 10 and clamping screws 13 to the cross strut 15 of the front carriage 11 of the thresher-mower 1. It is possible with the aid of the clamping screws, according to FIG. 2, to push the frame in the direction of the arrow III, either back or forth, or to additionally pivot it according to FIG. 3, in the direction of the arrow II. Thus, altogether, the possibility is offered of later mounting the dust repelling apparatus at any mower-threshers already in existence, via the frame 6 and the fastening flanges 10. Thanks to the lateral displaceability in the direction of the arrow III and the pivotability in the direction of the arrow II, the dust repelling apparatus according to the invention now can be arranged in such a manner that it protects the operator perfectly against dust generated by the retractable means 2. According to FIG. 3 the ventilator operates in the direction of the arrow I, so that the dust is moved away from the operator. He thus is protected completely against dust and nevertheless no cab is required, so that very favorable working conditions are created.

Because the air space behind and to the side of the driver 3 is considerably larger than the operative direction of the ventilator that is larger than the wind movement I, the driver is not seated in draft air. Conditions are further improved by the fact that the wall 14 of the mower-thresher 1 is behind the operator. Thus it is assured on the whole that all wind influences are deflected in the direction of the retractable means of the mower-thresher, and no draft air at all can be created.

The ventilator 5 advantageously is provided with 2 ventilator blades only, which assures that the driver's view upon the retractable or pull-in means is in no way obstructed. Thus, as indicated above, the dust-repelling apparatus 4 is arranged in driver's viewing direction between the driver's seat 3 and the operating apparatus 2, in fact obliquely thereto. Nevertheless, the driver's view 3 upon the retractable means 2 is not impaired as the two ventilator blades 12 in no way obstruct his view.

In FIG. 3 the ventilator blades 12 are arranged inclined. It also is possible to provide in lieu of these inclined ventilator blades 12 ventilator blades of a different design which are placed at a right angle to the axis of the motor 7. Moreover, it is possible, for example, to provide instead of the two ventilator blades 12, several ventilator blades, and to make them of transparent material. Here again, the driver's vision upon the operating instrument is not adversely affected.

It is possible to so arrange, via the clamping bushings 9, the protective screen 8 that greatest safety exists for the operating personnel ahead of the ventilator blades 12, with perfect assurance of the vision of driver 3. FiG. 1 shows that the total length of the ventilator blade is about equal to the width of the driver 3, so that the driver is perfectly protected against the dust built up by the retractable or suction means 2 of the mower-thresher.

As already mentioned, the dust-repelling apparatus 4 can be mounted later with the aid of the clamping screws 13 and the fastening flanges 10 of the frame on any type of mower-thresher, so that thereby in an advantageous manner a cost-saving apparatus is created which nevertheless is highly efficient in practical operations and which offers considerable advantages for the driving comfort and health of the operator of the mower-thresher. The dust repelling apparatus 4 according to the invention is not limited to its application in a mower-thresher; for example it may also be used in road construction or in other earth moving equipment and wherever a driver's seat accessible to dust is present on a vehicle and located behind an operating apparatus which builds up dust. For example, it also is possible to provide a plurality of air discharge nozzles arranged between the driver's seat and the operating apparatus. Here again, depending on the type of mower-thresher, the driver is protected perfectly against the buildup of dust.

Another possiblity exists of providing several ventilators instead of one ventilator, whose blast air currents protect the driver.

In addition, it also is possible to place the driver's seat inside a cab placed in the range of the air current source. This cab is provided with lateral air apertures.

According to another embodiment of the invention, which is not shown in detail, it also is possible to provide two air current sources instead of only one, which in like manner as described above are arranged between the driver's seat and the operating apparatus. As a result of this embodiment, the dust repelling effect is further improved.

What is to be secured by Letters Patent of the United States is:

1. In a work vehicle having a front end in the direction of travel of the vehicle, a cab area and a seat in the cab area for the driver which faces toward the front end, said vehicle having a dust generating mechanical implement attached at its front end and ahead of the seat, which dust moves toward the driver during vehicular travel, the herein invention comprising: forced air flow generating means mounted on said vehicle between said seat and said front end, said air flow generating means being forwardly directed for directing a forced air discharge in a stream frontwardly of the seat and establishing a principal suction area about the seat, said forced air flow generating means comprises at least one ventilator, and an open frame transversely of the vehicle, said frame constituting mounting means for mounting said ventilator for adjustment on and relative to said vehicle.

2. The apparatus of claim 1 wherein the mounting means mounts said ventilator for vertical adjustment relative to said vehicle.

3. The apparatus of claim 2 wherein the mounting means mounts said ventilator for transverse adjustment relative to said vehicle.

4. The apparatus of claim 3 including a wall mounted on said vehicle rearward of said seat and transversely elongated across the vehicle.

5. The apparatus of claim 3 wherein the mounting means mounting the ventilator on the vehicle includes a strut fixed transversely across the vehicle and a frame pivotally engaged with the strut, said ventilator being secured to said frame for pivotal adjustment therewith.

6. The apparatus of claim 5 including a protective screen arranged on said frame in surrounding relation to said ventilator and means for slidably adjusting said screen on said frame.

7. The apparatus of claim 1 and a wall located behind said seat arranged transverse to the direction of travel of the vehicle in the area of action of the ventilator.

8. The apparatus of claim 1 wherein the ventilator has transparent blades.

* * * * *